US012567156B2

(12) United States Patent
Zhou

(10) Patent No.: US 12,567,156 B2
(45) Date of Patent: Mar. 3, 2026

(54) METHOD FOR CORNER DETECTION ON UNIFIED CALIBRATION BOARD BETWEEN DVS AND CAMERA

(71) Applicant: Harman International Industries, Incorporated, Stamford, CT (US)

(72) Inventor: Rengao Zhou, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 292 days.

(21) Appl. No.: 18/547,144

(22) PCT Filed: Mar. 29, 2021

(86) PCT No.: PCT/CN2021/083543
§ 371 (c)(1),
(2) Date: Aug. 18, 2023

(87) PCT Pub. No.: WO2022/204864
PCT Pub. Date: Oct. 6, 2022

(65) Prior Publication Data
US 2024/0153098 A1     May 9, 2024

(51) Int. Cl.
| | |
|---|---|
| *G06T 7/13* | (2017.01) |
| *G06T 3/40* | (2024.01) |
| *G06T 5/30* | (2006.01) |
| *G06V 10/46* | (2022.01) |

(52) U.S. Cl.
CPC ................. *G06T 7/13* (2017.01); *G06T 3/40* (2013.01); *G06T 5/30* (2013.01); *G06V 10/46* (2022.01); *G06T 2207/20164* (2013.01)

(58) Field of Classification Search
None
See application file for complete search history.

(56) References Cited

U.S. PATENT DOCUMENTS

2020/0151907 A1     5/2020  Sugita

FOREIGN PATENT DOCUMENTS

| CN | 101271576 A | 9/2008 |
|---|---|---|
| CN | 103996191 A | 8/2014 |
| CN | 104036244 A | 9/2014 |
| CN | 109949373 A | 6/2019 |

OTHER PUBLICATIONS

Nearest Neighbour Corner Points Matching Detection Algorithm. Zhang et al. (Year: 2015).*

(Continued)

*Primary Examiner* — Delomia L Gilliard
(74) *Attorney, Agent, or Firm* — McCoy Russell LLP

(57)     ABSTRACT

A chessboard corner detection method on a camera image of the DVS-camera unified calibration board is provided. The method detects the multiple corners of the chessboard in the camera image by expanding the areas in color opposite to the binarized blob to eliminate the blob and separates the squares in the image, wherein the outer edge of the chessboard with the same color as the binarized spots needs to be filled with the opposite color in advance. Each corner can be marked then at the middle point of the line connecting the separated adjacent squares.

20 Claims, 10 Drawing Sheets

(56) References Cited

OTHER PUBLICATIONS

Co-calibration and Registration of Color and Event Cameras. Zhang, Q, et al. (Year: 2020).*

Zhang, C. et al., "Nearest Neighbor Corner Points Matching Detection Algorithm," Matec Web of Conferenes vol. 22, Proceedings of the International Conference on Engineering Technology and Application (ICETA 2015), Apr. 22, 2015, Taipei, Taiwan, 6 pages.

Mueggler, E. et al., "Towards Evasive Maneuvers with Quadrotors using Dynamic Vision Sensors," Proceedings of the European Conference on Mobile Robots, Oct. 2, 2015, Lincoln, United Kingdom, 8 pages.

Zhang, Q. et al., "Co-Calibration and Registration of Color and Event Cameras," Army Research Laboratory Report, ARL-TR-9108, Available as Early as Nov. 1, 2020, 28 pages.

European Patent Office, Extended European Search Report Issued in Application No. 21933550.2, Oct. 28, 2024, Germany, 10 pages.

ISA National Intellectual Property Administration of the People's Republic of China, Office Action and Search Report Issued in Application No. PCT/CN2021/083543, Dec. 30, 2021, WIPO, 2 pages.

* cited by examiner

200

210

220

310

350

320

330

340

420″

430″

510

METHOD FOR CORNER DETECTION ON UNIFIED CALIBRATION BOARD BETWEEN DVS AND CAMERA

CROSS-REFERENCE TO RELATED APPLICATIONS

The present application is a U.S. National Phase of International Application No. PCT/CN2021/083543, entitled "A METHOD FOR CORNER DETECTION ON UNIFIED CALIBRATION BOARD BETWEEN DVS AND CAMERA", and filed on Mar. 29, 2021. The entire contents of the above-listed application are hereby incorporated by reference for all purposes

TECHNICAL FIELD

The present disclosure relates generally to unified calibration technology between a dynamic vision sensor (DVS) and a camera. More particularly, the present disclosure relates to a chessboard corner detection method on a camera image of a DVS-camera unified calibration board.

BACKGROUND

In image measurement or machine vision applications, the calibration of a vision sensor is a very critical challenge. The accuracy of the calibration result and the stability of the calibration algorithm directly affect the accuracy of the result produced by the vision sensor.

In a multi-camera system comprising multiple cameras, the calibration technology is usually utilized to figure out the mapping or projection relationships to match the images between its cameras. During the calibration, the cameras each captures an image of the same calibration board with chessboard pattern at the same time, and then detects the corresponding corners in the images, respectively, to find the projection relationships between these cameras.

On the other hand, DVS is a dynamic vision sensor with high dynamic range, low-latency and with no motion blur. When it is necessary to bind a DVS to a conventional camera for performing applications in an integrated manner, the unified calibration between the DVS and the camera is required before use. The unified calibration between the DVS and the camera finds the spatial conversion relationship between them in order to realize the subsequent fusion of the DVS data and the camera image. After binding, any applications that are conducted by the camera may also be possible for the DVS.

However, The DVS only captures intensity changes and then creates asynchronous pixels. Because of the different characteristics between the DVS and the conventional camera, the processing for unified calibration of the two should be re-established. However, such changes are bound to cause a series of problems, such as, the position detection of certain points in the perspective of the camera is not accurate.

The present disclosure proposes a solution for the camera to perform accurate corner detection on the camera image in the unified calibration algorithm between the DVS and the camera.

SUMMARY

A method provided in the present invention may be used for the chessboard corner detection on an image of a DVS-camera unified calibration board captured by a camera.

The method comprises the step of receiving firstly in a processor a camera-captured image of a DVS-camera unified calibration board. The image may comprise a chessboard pattern and multiple blobs generated by light spots emitted from the plurality of LEDs each attached at the corners of the chessboard, respectively. Then, the image may be binarized into at least two areas in colors of two opposite colors, such as black and white, respectively. Next, the areas in the color opposite to the blobs may be expanded to separate squares in the image. Each of the separated squares can be identified by detecting its contours with four vertices. Thus, the corners in the chessboard can be marked by calculating middle points between the adjacent separated squares.

Any combination of one or more computer readable medium(s) may be utilized to store instructions which, when processed by a processor, performs the steps of the method for chessboard corner detection on an image of a DVS-camera unified calibration board provided in the present disclosure.

BRIEF DESCRIPTION OF THE DRAWINGS

The present disclosure may be better understood from reading the following description of non-limiting embodiments, with reference to the attached drawings. In the FIGs, like reference numeral designates corresponding parts, wherein below.

DETAILED DESCRIPTION

The detailed description of one or more embodiments of the present disclosure is disclosed hereinafter; however, it is understood that the disclosed embodiments are merely exemplary of the present disclosure that may be embodied in various and alternative forms. The FIGs are not necessarily to scale; some features may be exaggerated or minimized to show details of particular components. Therefore, specific structural and function details disclosed herein are not to be interpreted as limiting, but merely as a representative basis for teaching one skilled in the art to variously employ the present disclosure.

In the camera calibration, a chessboard formed with black grids and white grids is usually used as the calibration board. The camera captures the image of the calibration board, and thus generates a camera image of the chessboard containing multiple black squares and white squares. In general, the camera identifies each of the black squares in the chessboard image, and then detects the corners in it. One corner in the chessboard image generally is defined as the point where the black squares intersect, that is, such as the common vertex of the opposite corners of the two black squares diagonally adjacent to each other.

In a multi-camera system, the calibration between cameras is performed by capturing the chessboard images on the same calibration board by each of these cameras, and then the cameras detect the corresponding corners to find the mapping relationship between every two cameras, respectively. In a similar way, in the unified calibration between the DVS and the camera, the DVS and the camera are fixed together and both face to the same chessboard, so they can detect the corresponding corners, respectively, to establish the mapping relationship between the DVS data and the camera image.

Figure 1A:
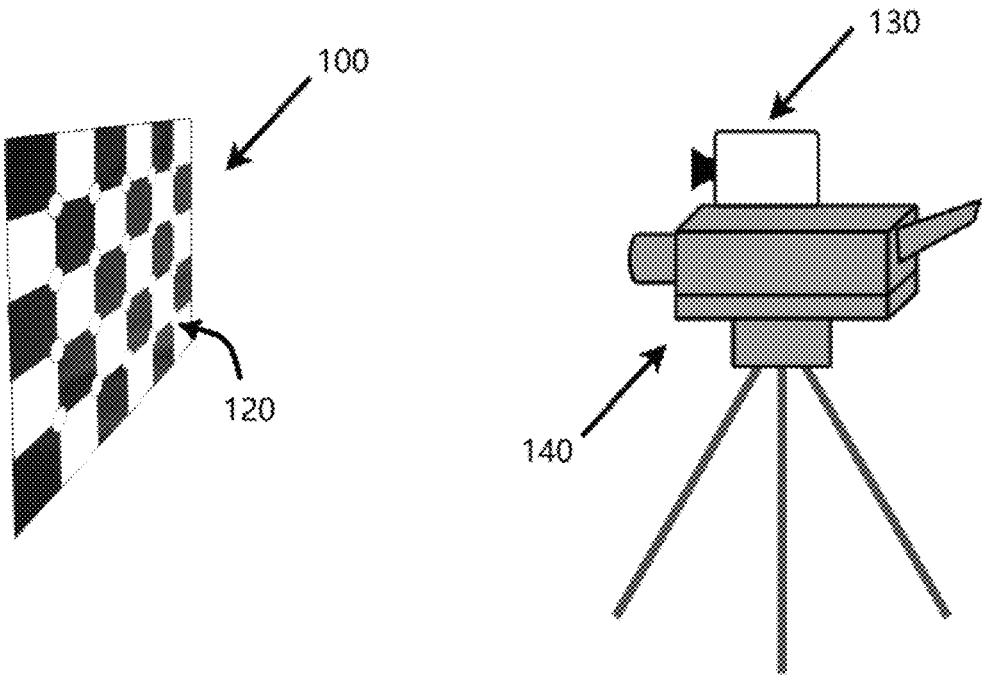
FIG. 1A illustrates an example hardware system scene for realizing the unified calibration between the DVS and the camera according to one or more embodiments.

FIG. 1A illustrates an example hardware system scene for performing the unified calibration between the DVS and the camera. It is desired to make the DVS 130 and the camera 140 to find the corresponding corners 120 from the chessboard 100 on the calibration board, and thus makes it possible to both the DVS and the camera to apply calibration algorithms to perform the calibrations. The calibration algorithms known in the art include but not limit to, such as, one proposed by Zhang Zhengyou called as the Zhang's Calibration algorithm, and another one named the Tsai two stage method.

However, unlike the conventional camera, the DVS does not generate images. The DVS transmits pixel-level events representative of intensity changes. The event data is in a form of [x, y, t, p], in which x and y stand for the coordinates of the captured intensity changes in the pixel coordinate system, t stands for the time stamp of this event, and p stands for the polarity meaning this pixel-level change is becoming whether brighter or darker. Therefore, in a way of example, an intensity change can be manually introduced by using high frequency LED arrays to function as the corners, so that the DVS can catch the flashing LEDs and may position the corners in the chessboard.

Figure 1B:
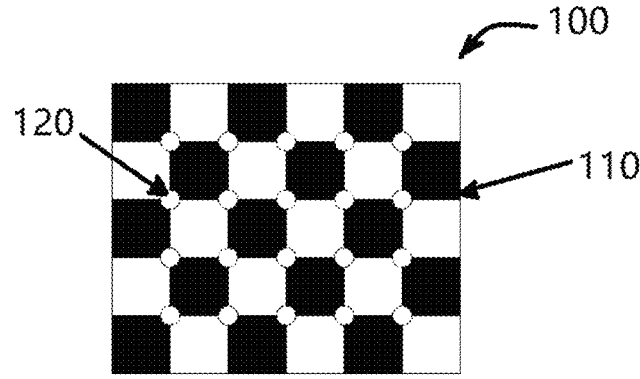
FIG. 1B illustrates an example calibration board used in the unified calibration between the DVS and the camera according to one or more embodiments.

FIG. 1B illustrates an example unified calibration board used in the unified calibration between the DVS and the camera according to one or more embodiments. As shown in FIG. 1B, the unified calibration board 100 consists of the normal chessboard pattern 110 and the plurality of LEDs 120 attached, such as by welding, to the corners of the normal chessboard pattern 110. In the example of FIG. 1B, the calibration board 100 has the chessboard pattern 110 with 5×6 black and white squares and twenty LEDs 120 at the corners. It should be noted that other predetermined suitable number of chessboard grids and LEDs are also available. In general, these LEDs preferably have the similar brightness and flash at the same frequency.

Ideally, the camera would find the corners in the chessboard pattern 110 and the DVS would find the flashing LEDs 120 at the corners. Since the LEDs are located precisely at the corners, the corners found by the DVS would be matched one by one to the corners found by the camera, thereby to establish the mapping relationship between the two.

Nevertheless, the actual situation is that the image captured by the camera includes light blobs on the chessboard created by light spots emitted from these flashing LEDs, which may affect the corner detection on the camera image of the chessboard. After attaching the high-frequency LED lights at the corners of the chessboard, the algorithms of camera's finding chessboard corners would fail, as it needs to identify the squares, but a bright LED may create a big light spot. Then, the blobs generated in the camera image may cover the four vertices of the black and white squares in the image, disturb the square depiction of the chessboard, and cause the detection results miss the position of the corners as a result. Besides, apart from the detection failures, it is also possible that the chessboard corner detection algorithms locate the corners at wrong positions.

Figure 2:
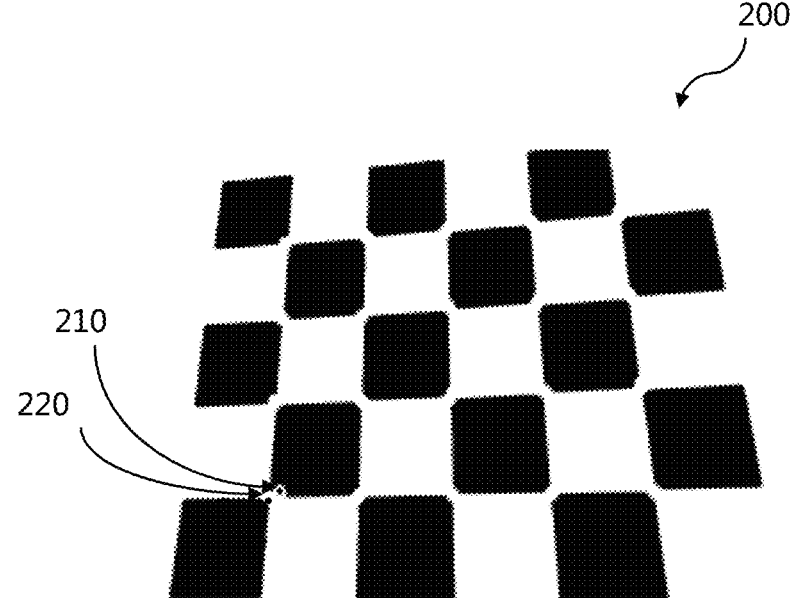
FIG. 2 illustrates an example of a chessboard corner detected at a wrong location on the unified calibration board.

FIG. 2 illustrates an example result of the corner detection on the camera image of the chessboard 200 with LEDs 220 at the corners, wherein the bottom left detected corner is located on the wrong position 210, which was expected to be at the exact place as the LED 220. The reason why the corner detection fails on this chessboard 200 is in that: the light spot created by the flashing LED 220 disturbs the square depiction of the chessboard, which causes the generated black square in the image to lose its corners, and thus makes the square recognition fail.

In this case, the corner detection method provided in the present disclosure may overcome the interference of the light blobs generated by the LEDs set on the chessboard for DVS on the corners of the camera image, so as to accurately detect each of the corners in the image of the chessboard.

Firstly, in the hardware scene as shown in FIG. 1A, the camera 140 captures an image of the calibration board on which comprises the chessboard 100 with the LEDs 120 at each corner. Then, the camera image may be sent to a processor for example and may be displayed on a screen, where the image may show a chessboard pattern with multiple black and white approximate squares and the circular blobs respectively generated near the corner positions.

In order to accurately locate the corners in the chessboard, the method herein binarizes the camera image into a binary image with black areas and white areas. From an intuitive point of view, it is to set the image with grayscale changes as a black and white image with only black and white. In a way of example, for an 8-bit image, the binarization operation is usually to set its pixel value to 0 or 255. In an example, the value of 0 corresponds to black, and 255 corresponds to white. It is conceivable that whether or not the selection of the threshold is appropriate may affect the color of the blobs after the image binarization. In an example, the chessboard image can be binarized with an adaptive threshold of nearly block mean value.

Figure 3:
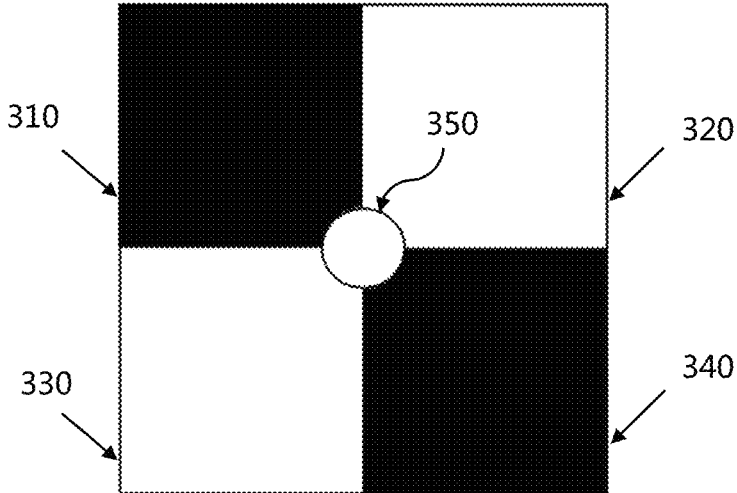
FIG. 3 illustrates an example of a partially enlarged view of the camera image of the chessboard with a blob generated by a LED light spot after binarizing the camera image.

In one aspect, when the LEDs at the corners of the chessboard are bright enough, the blobs generated in the camera-captured image and created by the LED light spots may be binarized into white in the binarization of the camera chessboard image, and then the result binarized image can be as partially shown in FIG. 3.

FIG. 3 illustrates a partially enlarged view of the camera image of the unified calibration board. Four approximately square-shaped black and white areas (310, 320, 330, 340) with missing corners are included in this image. It can be expected from FIG. 3 that the corner should be detected about at the middle point of the two approximately square-shaped black areas (310, 340). However, since the circular-shaped blob 350 generated in the chessboard image by the light spot emitted from the LED attached at the corner covers the position of the original corner, it is difficult to accurately locate the corner.

In this case, it may be much difficult to eliminate the blobs herein using a method usually eliminating noise of the image by expanding the white areas of the chessboard to separate the black squares, because the black areas which were originally expected to be formed by black squares in the image have been destroyed by the blobs to irregular shapes. When expanding the white area, the dilation procedure may be used to go over all the white pixels and, for every white pixel, turns all the surrounding pixels to white. The black areas would even become less like square shape with the iterative dilation process of the white areas, which renders it difficult to separate the black squares for subsequent corner detecting.

In order to solve this problem, instead of expanding the white areas to separate the black squares, the black areas may be expanded so as to overcome the negative effects introduced by the LEDs. In the method, after binarizing the camera image of the unified calibration board in which the light blobs 350 generated in the image are binarized to white, the black areas can be directly expanded by such as iteratively dilating the black areas, while the white areas are shrunk as they are adaptively eroded until the white blobs disappear, so that the white squares are separated and then can be used to the subsequent corner detection.

It is conceivable that the above method may be alternatively processed by firstly reverting, i.e., inverting the colors of the camera image, and then expanding the white areas after reverting, as will be explained below with reference to FIGS. 4A-4C, for example.

After binarizing the camera image of the unified calibration board and in case of the light blobs 350 generated in the image are binarized to white, the colors of the image that has been binarized into black and white can be reverted, that is, the black areas in the image are reverted to white, while the white areas are reverted to black. In the example, the image shown in FIG. 3 can be color reverted to FIG. 4A. Then, it can be seen that the approximately circular blobs 450 has been color reverted into black and is located about the middle of the four approximately square-shaped white and black areas (410, 420, 430 and 440). Thus, it is possible to separate the black squares by expanding the white areas (410, 440). In a way of example, the white areas (410, 440) in the image can be expanded by such as dilating its boundaries, i.e., changing the black pixels at the intersection boundary between the black areas (420, 430, 450) and the white areas (410, 440) into white, which makes the white areas (410, 440) likely to "area expansion". The result of iteratively dilating the white areas is that the white areas (410, 440) is getting larger, while the black areas (420, 430, 450) is adaptively eroded to "area shrinkage" and thereby is getting smaller.

Figures 4A, 4B:
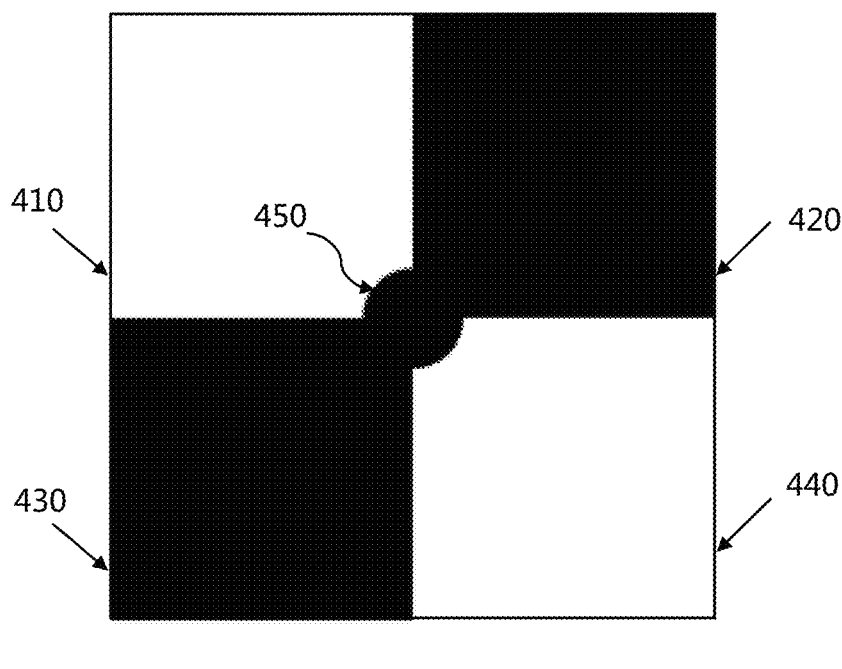
FIGS. 4A-4C illustrates an example of separating the squares by expanding the white areas on the reverted binary image of FIG. 3 according to one or more embodiments.

As shown in FIG. 4B, with dilating the white areas (410', 440'), the black areas (420', 430', 450') continues to be eroded, and the black circular blob 450' continues to shrink until it disappears. Therefore, the blob 450' will be eventually eliminated, while the two black squares each with all four vertices will be separated.

Figure 4C:
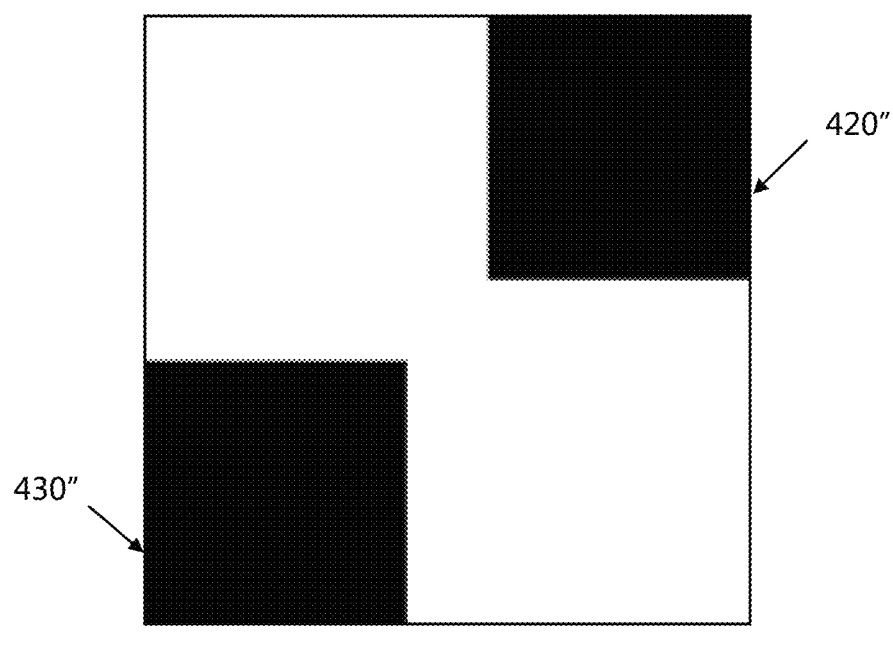

FIG. 4C shows two successfully separated black squares (420", 430"). These two black squares are derived from the two approximately square-shaped black areas (420, 430) by eliminating the blob 450 with expanding the white areas (410, 440) in FIG. 4A, and can be used for the further corner detections. However, FIG. 4C only shows a small part of the chessboard image, for example, the upper left part of the chessboard image. It is conceivable that the result derived after the black square separation performed on the complete chessboard image can be shown in FIG. 5. At this stage, each of the separated squares can be identified with detecting its contours with four vertices.

Figure 5:
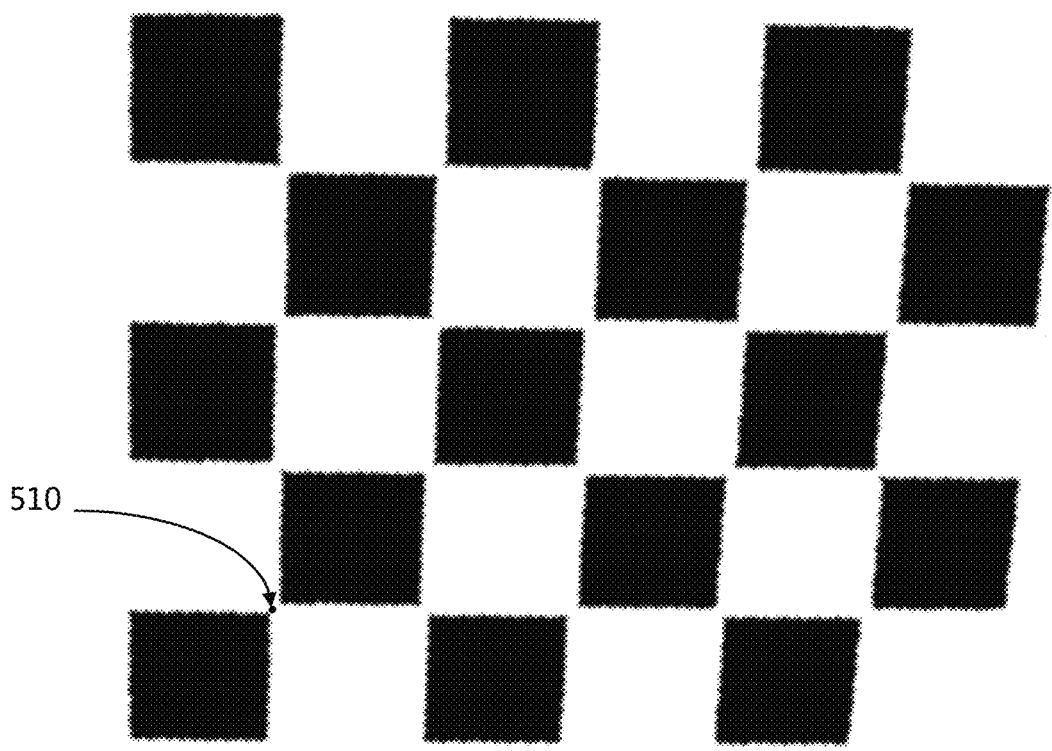
FIG. 5 illustrates an example of result derived after the color inversion and the dilation processing on the chessboard image according to one or more embodiments.

In general referring to FIG. 5, each of the black squares has its diagonally adjacent black squares. The one with four adjacent black squares may be defined as an inner black square, and the one with only one or two adjacent black squares may be a black square at the border. Then, by using a line to connect one vertex of the inner black square and the corresponding opposite vertex of its the diagonally adjacent squares, the middle point of the line can be calculated and marked as the detected corner, as shown in FIG. 5 with the reference number of 510.

Figure 6:
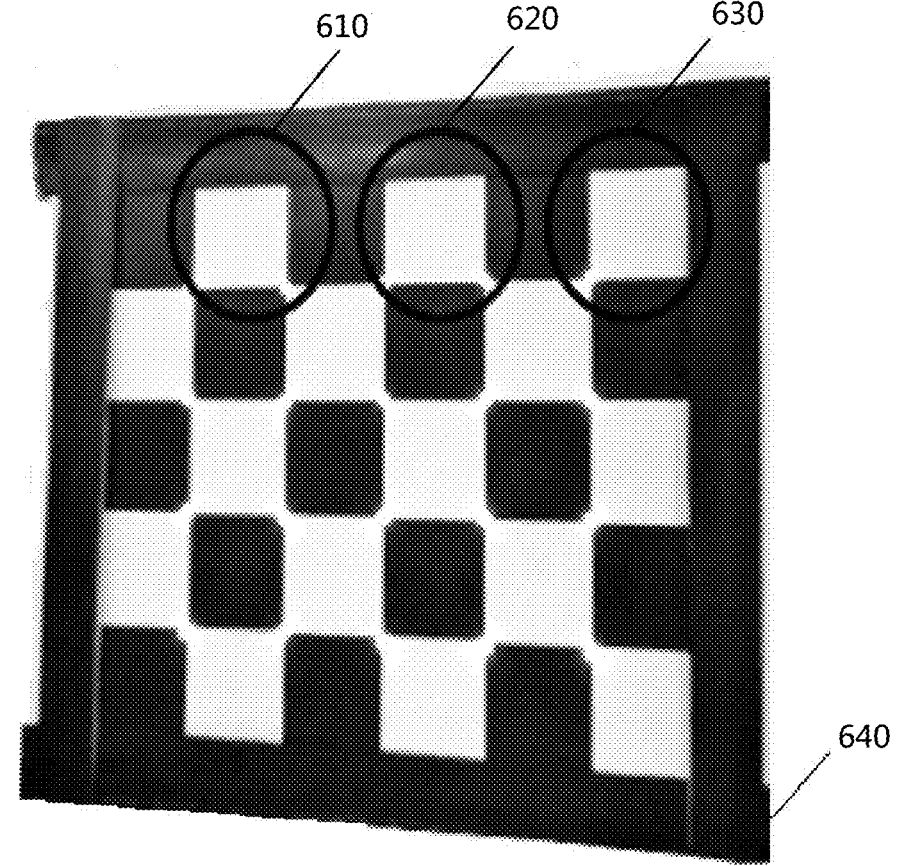
FIG. 6 illustrates an example of filling a black outer edge to the chessboard in case that the blobs are binarized in white according to one or more embodiments.

It should be noted that, as to the conventional chessboard pattern setting, it usually arranges the black squares on a white background, so that the white outer edges may help to identify the black squares. However, in the case that the light blobs generated in the binarized the camera image of the unified calibration board are binarized to white as described in the above situations, the method may either expand the black areas to separate the white squares, or expand the reverted white areas to separate the black squares reverted (i.e., the original white squares), and the white outer edges would then get mixed up with the desired white squares. Therefore, in this case the color of the outer edge needs to be filled in black in advance to ensure that the contours of the white squares (such as, circled with reference number 610, 620, 630 in FIG. 6) at the edge are complete with four vertices. This can be processed via software processing, for example, by automatically adding a black boundary to the chessboard in the camera image. Or alternatively, in the real world the outer edge of the chessboard may be filled into black either by paint in black color, or by attaching some black bands 640 to the outer edges, as shown in the example of FIG. 6, for examples.

Figure 7A:
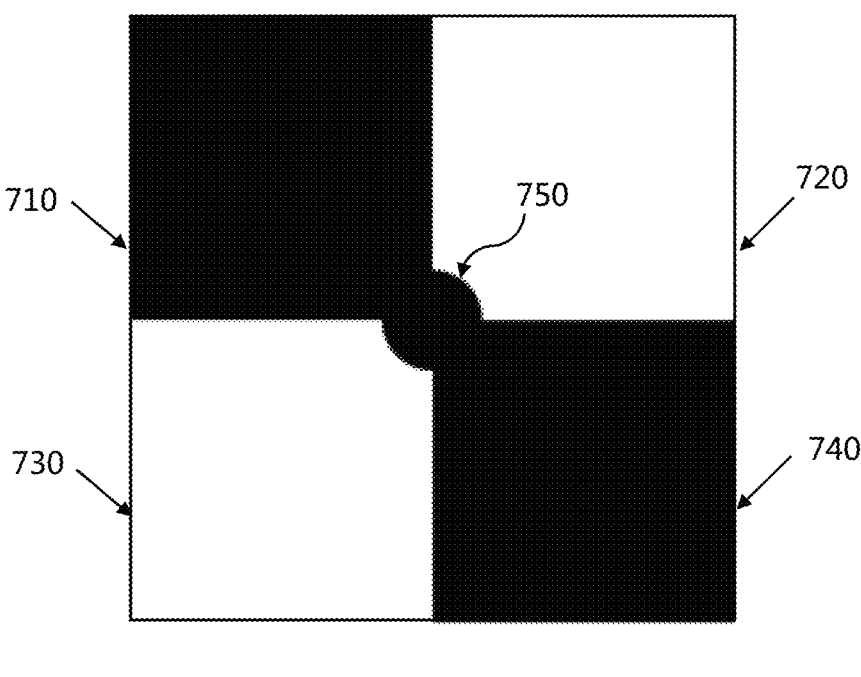
FIGS. 7A-7C illustrates an example of separating the squares by reducing the black areas directly on the binary image according to one or more embodiments.

In another aspect, in the method when binarizing the camera-captured chessboard image, the blobs generated in the image by the LED light spots may otherwise be binarized to black. This may be due to the LEDs at the corners of the chessboard are darker, or may be related to the selection of the threshold for the binarization. Then, in an example, the result image after the binarization can be partially enlarged as shown in FIG. 7A, which contains the four approximately square-shaped black and white areas (710, 720, 730, 740) and one circular black blob 750.

Figure 7B:
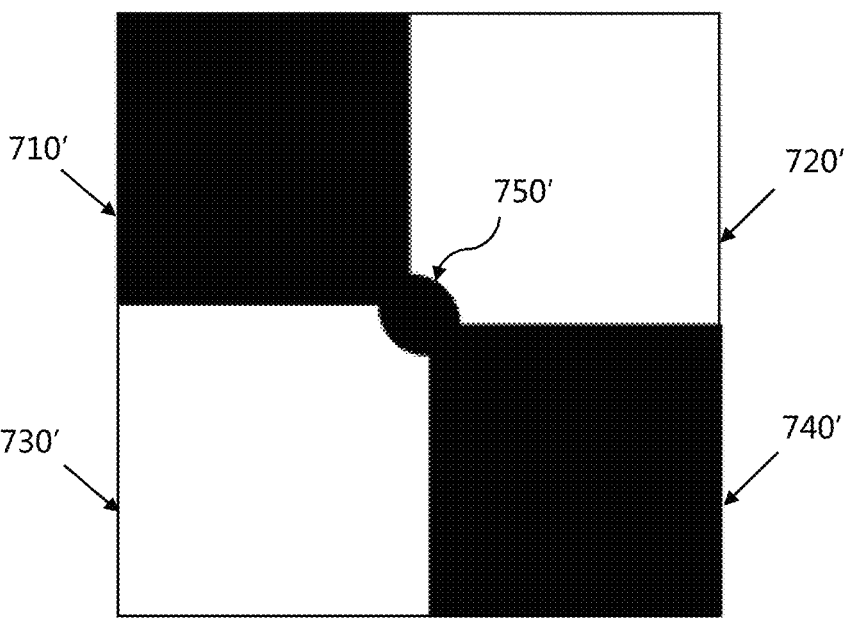
Figure 7C:
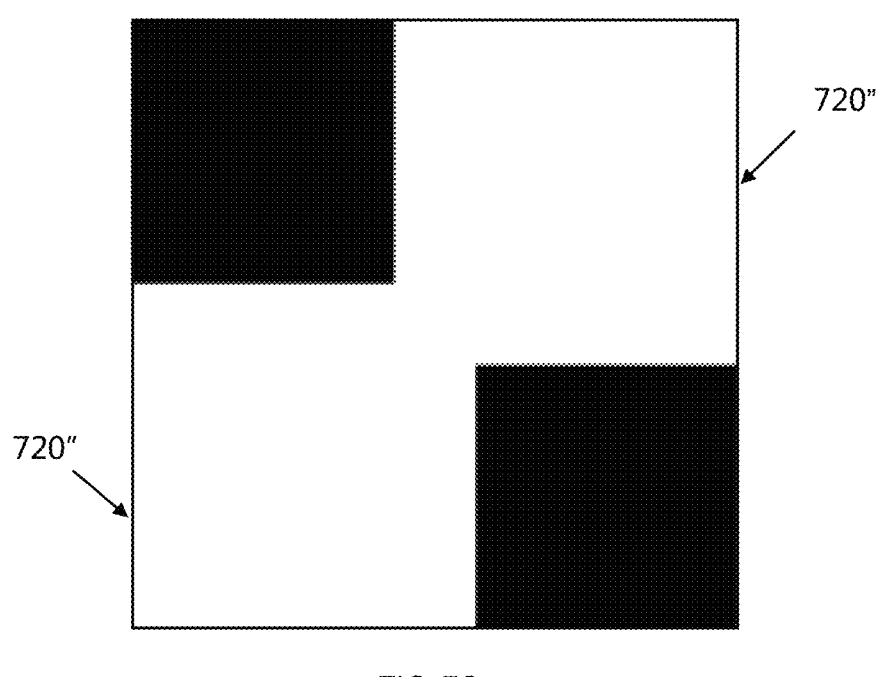

In this case, after binarizing the chessboard image into white and black where the blobs in the image are binarized to black, reducing the black areas containing the black circular blob, for example, by iteratively eroding the black area, or alternatively, expanding the white area, for example, by iteratively dilating the white area, may separate the black squares for the subsequent corner detection. As shown in FIG. 7B, with dilating the white areas (720', 730'), iteratively, the black areas (710', 740', 750') continues to be eroded and shrinks until the black circular blob 750' disappears. Finally, the two black squares (710", 740") each with four vertices have been separated so far, as shown in FIG. 7C.

Alternatively, in this aspect when the circular blobs in the image are binarized to black, the camera image can be firstly reverted, and then to dilate the black areas reverted. Thus, the reverted white areas containing the reverted white circular blob continues to be eroded and shrinks until the white blob disappears. In this way, two desired white squares (which were original black before reverted) each with four vertices can be successfully separated.

It can be noticed that, in this aspect with the binarized black blobs in the image, the conventional white outer edges of the chessboard may not get mixed up with the desired squares, and for this case no certain process is necessary to deal with the color of the outer edge. Therefore, in the method disclosed herein, when the blobs in the camera image are binarized into the same color as the outer edge, the outer edge of the chessboard needs to be filled with the opposite color. In an example, the outer edge of the chessboard in rare cases may be black. The black outer edge needs to be filled with white if the blobs are binarized into black areas in the image, and this situation should be considered to fall within the scope of the present disclosure.

Next, as described in the one aspect previously, every one vertex of each inner black square and the corresponding opposite vertex of its diagonally adjacent squares can be connected using a line, and the middle point of the line can be marked as the detected chessboard corner by calculating. The corner detection method provided in the present disclosure can be cyclically performed for all the inner black squares contained in the entire chessboard, so as to detect all of the multiple corners in the chessboard.

Figure 8:
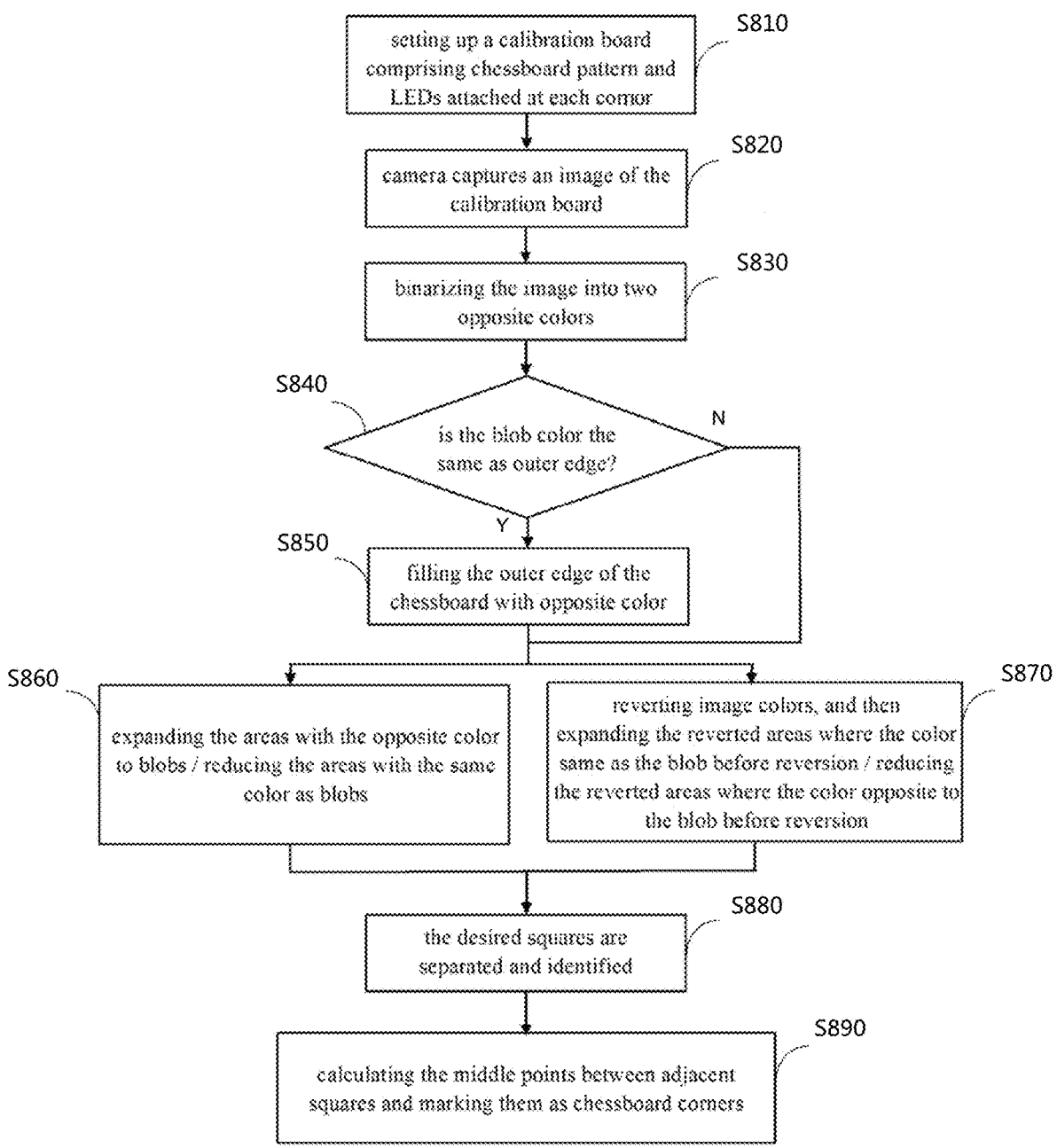
FIG. 8 shows an example flowchart illustrating the method for corner detection of the camera in unified calibration between DVS and camera according to one or more embodiments.

FIG. 8 illustrates the flowchart of the above method for the corner detection of the camera in unified calibration between the DVS and the camera according to one or more embodiments, which may comprise the following steps S810 to S890.

S810: setting up the unified calibration board for the unified calibration between the DVS and the camera. The unified calibration board comprises a normal chessboard with black and white grids and a plurality of high-frequency LEDs at each corner of the chessboard;

S820: capturing by the camera an image of the unified calibration board. The camera-captured image may include the chessboard pattern with the black and white squares and a multiple circular blobs at the chessboard corners generated by light spots emitted from the plurality of flashing LEDs;

S830: binarizing, in a processor, the camera image into two opposite colors, such as black and white. In this step, an appropriate threshold should be selected, and only the black and white areas are left in the whole image after the binarization;

S840: determining the color of the binarized blobs is either white or black. When the blobs are binarized into the same color as the outer edge of the chessboard, and for example the outer edge usually is set white, the method goes to the step S850. Otherwise, when the binarized blobs are not the same as the outer edge, which in the example is black, the method skips the step S850 and directly goes to either the step S860 or S870;

S850: filling the outer edges of the chessboard into the color opposite to the blobs. In the example, in case that the blobs are binarized into white, filling the outer edge with a black boundary may avoid confusing the white square to be detected at the border;

S860: expanding the areas with the opposite color to the blobs, or reducing the areas with the same color as the blobs. In this step, in case of the example that the blobs in the image are binarized into white, expanding the black areas or reducing the white areas till separating the white squares;

S870: alternatively, reverting the colors of the image, and then expanding the areas where the reverted color that is then the same as the blob color before reversion, or reducing the areas where the reverted color that is opposite to the blob color before reversion. In this step, in the case that the blobs in the image are binarized into white, after reverting the colors of the image, expanding the reverted white areas or reducing the reverted black areas so as to separate the black squares, which can be used for the subsequence corner detection;

S880: the desired squares, either in black or white, may be separated, and can be identified in the image, and S890: calculating the middle points between adjacent squares and marking them as the detected chessboard corners. Then the method has been completed so far.

The present disclosure proposes a chessboard corner detection method on camera images, of the unified calibration between the DVS and the camera. A software algorithm is created in this inventive subject matter. This is a very base technology, and any further applications would depend on this.

Any combination of one or more computer readable medium(s) may be utilized to perform the method in the present disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

After the unified calibration, any applications that conducted by camera would also be possible for DVS. For example, multiple view geometry, wherein both the projection matrices from each of the DVS and the camera can be combined to obtain the inverse projection matrix, used to estimate the point spatial situation with the information received from all the vision sensors. For example, 3D reconstruction is achieved by using the extrinsic projection matrix in reverse given the 2D points from two vision sensors.

The method of the present disclosure comprises, but not limited to, the items listed hereinafter.

Item 1: a method for chessboard corner detection on an image of a DVS-camera unified calibration board, comprising following steps of:

a. receiving, in a processor, the image of the chessboard captured by a camera;

b. binarizing the image into areas of two opposite colors;

c. expanding the areas with the color opposite to blobs to separate squares in the image;

d. identifying each of the separated squares by detecting contours with four vertices;

e. calculating middle points between the adjacent separated squares, and f. marking the calculated middle points as the corners on the calibration board.

Item 2: the method for chessboard corner detection on an image of a DVS-camera unified calibration board of item 1, wherein the chessboard comprises a plurality of LEDs at the corners of the chessboard.

Item 3: the method for chessboard corner detection on an image of a DVS-camera unified calibration board of any of items 1-2, wherein the blobs on the image are generated by light spots emitted from the plurality of LEDs, respectively.

Item 4: the method for chessboard corner detection on an image of a DVS-camera unified calibration board of any of items 1-3, wherein the method further comprises selecting an adaptive threshold of nearby block mean value for binarizing the image into the areas.

Item 5: the method for chessboard corner detection on an image of a DVS-camera unified calibration board of any of items 1-4, wherein the blobs can be binarized into the areas in either of the opposite colors.

Item 6: the method for chessboard corner detection on an image of a DVS-camera unified calibration board of any of items 1-5, wherein the two opposite colors are black and white, respectively.

Item 7: the method for chessboard corner detection on an image of a DVS-camera unified calibration board of any of items 1-6, wherein expanding the areas in the color opposite to blobs comprises dilating the areas in the color opposite to blobs, iteratively.

Item 8: the method for chessboard corner detection on an image of a DVS-camera unified calibration board of any of items 1-7, wherein expanding the areas in the color opposite to blobs comprises eroding the areas in the color same with the blobs, iteratively.

Item 9: the method for chessboard corner detection on an image of a DVS-camera unified calibration board of any of items 1-8, wherein in case that the blobs are binarized into the areas in the same color with an outer edge of the chessboard, the method further comprises a step of filing the outer edge of the chessboard to form a boundary in the opposite color.

Item 10: the method for chessboard corner detection on an image of a DVS-camera unified calibration board of any of items 1-9, wherein expanding the areas in the color opposite to blobs may eliminate the blobs in the image.

Item 11: A computer readable medium may be utilized to store instructions which, when processed by a processor, performs the following steps of the method for chessboard corner detection on the image of the DVS-camera unified calibration board of any of items 1-10, comprising:

a. receiving the image of the chessboard captured by a camera;

b. binarizing the image into areas of two opposite colors;

c. expanding the areas in the color opposite to blobs to separate squares in the image;

d. identifying each of the separated squares by detecting contours with four vertices;

e. calculating middle points between the adjacent separated squares, and f. marking the calculated middle points as the corners on the calibration board.

Item 12: the computer readable medium storing the computer program that can be processed by the processor to realize the steps of item 11, wherein the chessboard comprises a plurality of LEDs at the corners of the chessboard.

Item 13: the computer readable medium storing the computer program that can be processed by the processor to realize the steps any of items 1-12, wherein the blobs on the image are generated by light spots emitted from the plurality of LEDs, respectively.

Item 14: the computer readable medium storing the computer program that can be processed by the processor to realize the steps any of items 1-13, wherein the steps further comprise selecting an adaptive threshold of nearby block mean value for binarizing the image into the areas.

Item 15: the computer readable medium storing the computer program that can be processed by the processor to realize the steps any of items 1-14, wherein the blobs can be binarized into the areas in either of the opposite colors.

Item 16: the computer readable medium storing the computer program that can be processed by the processor to realize the steps any of items 1-15, wherein the two opposite colors are black and white, respectively.

Item 17: the computer readable medium storing the computer program that can be processed by the processor to realize the steps any of items 1-16, wherein expanding the areas in the color opposite to blobs comprises dilating the areas in the color opposite to blobs, iteratively.

Item 18: the computer readable medium storing the computer program that can be processed by the processor to realize the steps any of items 1-17, The computer readable medium of claim 11, wherein expanding the areas in the color opposite to blobs comprises eroding the areas in the color same with the blobs, iteratively.

Item 19: the computer readable medium storing the computer program that can be processed by the processor to realize the steps any of items 1-18, wherein in case that the blobs are binarized into the areas in the same color with an outer edge of the chessboard, the method further comprises a step of filing the outer edge of the chessboard to form a boundary in the opposite color.

Item 20: the computer readable medium storing the computer program that can be processed by the processor to realize the steps any of items 1-19, wherein expanding the areas in the color opposite to blobs may eliminate the blobs in the image.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the invention.

The invention claimed is:

1. A method for chessboard corner detection on an image of a dynamic vision sensor (DVS)-camera unified calibration board, comprising following steps of:

receiving, in a processor, an image of a chessboard captured by a camera, wherein the image includes blobs on the chessboard that at least partially obscure one or more corners of the chessboard;

binarizing the image into areas of two opposite colors;

expanding the areas with a first color opposite to a second color of the blobs to separate squares in the image having the same color as the blobs;

identifying each of the separated squares by detecting contours with four vertices;

calculating middle points between adjacent separated squares, and marking the calculated middle points as the corners on the calibration board.

2. The method of claim 1, wherein the chessboard comprises a plurality of LEDs at the corners of the chessboard.

3. The method of claim 2, wherein the blobs on the image are generated by light spots emitted from the plurality of LEDs, respectively.

4. The method of claim 1, wherein the method further comprises selecting an adaptive threshold of nearby block mean value for binarizing the image into the areas.

5. The method of claim 4, wherein the blobs are binarized into the areas in either of the opposite colors.

6. The method of claim 1, wherein the two opposite colors are black and white, respectively.

7. The method of claim 1, wherein expanding the areas in the first color opposite to the second color of the blobs comprises dilating the areas in the first color opposite to blobs, iteratively.

8. The method of claim 1, wherein expanding the areas in the first color opposite to the second color of the blobs comprises eroding the areas in the same color as the blobs, iteratively.

9. The method of claim 1, wherein in case that the blobs are binarized into the areas in the same color with an outer edge of the chessboard, the method further comprising a step of filing the outer edge of the chessboard to form a boundary in the opposite color.

10. The method of claim 1, wherein expanding the areas in the color opposite to blobs eliminates the blobs in the image.

11. A non-transitory computer readable storage medium storing instructions which, when processed by a processor, cause the processor to:

receive an image of a chessboard captured by a camera, wherein the image includes blobs on the chessboard that at least partially obscure one or more corners of the chessboard;

binarize the image into areas of two opposite colors;

expand the areas with a first color opposite to a second color of the blobs to separate squares in the image having the same color as the blobs;

identify each of the separated squares by detecting contours with four vertices;

calculate middle points between the adjacent separated squares, and mark the calculated middle points as the corners on the calibration board.

12. The non-transitory computer readable storage medium of claim 11, wherein the chessboard comprises a plurality of LEDs at the corners of the chessboard.

13. The non-transitory computer readable storage medium of claim 12, wherein the blobs on the image are generated by light spots emitted from the plurality of LEDs, respectively, and wherein approximately half of the image of the chessboard is a first color that is the same color as the plurality of blobs, and approximately half of the chessboard is a second color that is opposite the first color.

14. The non-transitory computer readable storage medium of claim 11, wherein the steps further comprise selecting an adaptive threshold of nearby block mean value for binarizing the image into the areas.

15. The non-transitory computer readable storage medium of claim 14, wherein the blobs are binarized into the areas in either of the opposite colors.

16. The non-transitory computer readable storage medium of claim 11, wherein the two opposite colors are black and white, respectively.

17. The non-transitory computer readable storage medium of claim 11, wherein expanding the areas in the color opposite to blobs comprises dilating the areas in the color opposite to blobs, iteratively.

18. The non-transitory computer readable storage medium of claim 11, wherein expanding the areas in the color opposite to blobs comprises eroding the areas in the color same with the blobs, iteratively.

19. The non-transitory computer readable storage medium of claim 11, wherein in case that the blobs are binarized into the areas in the same color with an outer edge of the chessboard, the method further comprising a step of filing the outer edge of the chessboard to form a boundary in the opposite color.

20. The non-transitory computer readable storage medium of claim 11, wherein expanding the areas in the color opposite to blobs eliminates the blobs in the image.

* * * * *